United States Patent
Yamamoto et al.

(10) Patent No.: US 11,716,448 B2
(45) Date of Patent: Aug. 1, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Shinji Yamamoto, Yokohama (JP); Masato Kazui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 16/921,721

(22) Filed: Jul. 6, 2020

(65) Prior Publication Data

US 2021/0012149 A1 Jan. 14, 2021

(30) Foreign Application Priority Data

Jul. 9, 2019 (JP) ................................. 2019-127603

(51) Int. Cl.
*G06K 9/62* (2022.01)
*H04N 7/18* (2006.01)
(Continued)

(52) U.S. Cl.
CPC ............. *H04N 7/181* (2013.01); *G06F 18/22* (2023.01); *G06V 10/40* (2022.01); *G06V 10/761* (2022.01); *G06V 20/52* (2022.01); *H04N 23/90* (2023.01)

(58) Field of Classification Search
CPC ...... G06K 9/6215; H04N 5/247; H04N 7/181; H04N 5/23206; H04N 5/23218;
(Continued)

(56) References Cited

U.S. PATENT DOCUMENTS

2010/0166261 A1* 7/2010 Tsuji ....................... G06V 10/56
382/103
2013/0278774 A1* 10/2013 Fujimatsu .............. H04N 7/181
348/159

(Continued)

FOREIGN PATENT DOCUMENTS

JP H10304244 A 11/1998
JP 4759988 B2 8/2011
(Continued)

OTHER PUBLICATIONS

Navneet Dalal, et al., Histograms of Oriented Gradients for Human Detection, IEEE Computer Society Conference on Computer Vision and Pattern Recognition (CVPR), 2005, 8 pages.

(Continued)

*Primary Examiner* — Thai Q Tran
*Assistant Examiner* — Stephen R Smith
(74) *Attorney, Agent, or Firm* — Canon U.S.A., Inc. IP Division (57) ABSTRACT

An information processing apparatus includes a comparison unit configured to compare an image capturing condition for a collation target object with an image capturing condition for each of a plurality of image capturing apparatuses, a selection unit configured to select an image capturing apparatus to be collated from among the plurality of image capturing apparatuses based on a result of the comparison by the comparison unit, and a collation unit configured to collate information about an object captured by the image capturing apparatus to be collated with information about the collation target object.

19 Claims, 10 Drawing Sheets

(51) Int. Cl.
  *G06F 18/22* (2023.01)
  *H04N 23/90* (2023.01)
  *G06V 10/74* (2022.01)
  *G06V 10/40* (2022.01)
  *G06V 20/52* (2022.01)

(58) Field of Classification Search
  CPC .. H04N 5/23229; G06V 10/40; G06V 10/761; G06V 20/52
  USPC .......................................... 382/103; 348/159
  See application file for complete search history.

(56) References Cited

U.S. PATENT DOCUMENTS

| | | | |
|---|---|---|---|
| 2017/0193681 A1* | 7/2017 | Nomoto | G06V 10/462 |
| 2018/0239954 A1* | 8/2018 | Hamada | G06V 40/165 |
| 2019/0191098 A1* | 6/2019 | Ishii | H04N 7/181 |
| 2019/0258852 A1* | 8/2019 | Shimauchi | G06V 20/52 |
| 2020/0050901 A1* | 2/2020 | Kirchner | G06K 9/6292 |
| 2020/0177935 A1* | 6/2020 | Takasaki | H04N 21/8547 |
| 2021/0312200 A1* | 10/2021 | Ge | G06V 10/98 |

FOREIGN PATENT DOCUMENTS

| | | |
|---|---|---|
| JP | 2017139725 A | 8/2017 |
| WO | 2012/096166 A1 | 7/2012 |

OTHER PUBLICATIONS

Sakrapee Paisitkriangkrai, et al., Learning to rank in person re-identification with metric ensembles, IEEE Computer Society Conference on Computer Vision and Pattern Recognition (CVPR), 2015, pp. 1846-1855.

David C. Lee, Geometric Reasoning for Single Image Structure Recovery, IEEE Computer Society Conference on Computer Vision and Pattern Recognition (CVPR), 2009, 8 pages.

David M W Powers, Evaluation: from precision, recall and f-measure to roc, informedness, markedness and correlation, Journal of Machine Learning Technologies, Feb. 27, 2011, pp. 37-63, vol. 2, No. 1.

Ben Benfold, et al., Stable multi-target tracking in real-time surveillance video, IEEE Computer Society Conference on Computer Vision and Pattern Recognition (CVPR), 2011, 8 pages.

* cited by examiner

| CAMERA ID | CAMERA HEIGHT | DEPRESSION ANGLE | R-GAIN | G-GAIN | B-GAIN | TILT VALUE | ZOOM VALUE | Bv VALUE |
|---|---|---|---|---|---|---|---|---|
| 101 | 2 m | 20° | +10 | +0 | +0 | +20 | 20 | 8 |
| 102 | 2.3 m | 20° | +0 | +10 | +10 | +20 | 10 | 5 |
| 103 | 1.5 m | 10° | +0 | +10 | +10 | +10 | 10 | 2 |
| 104 | 2.3 m | 30° | +0 | +10 | +10 | +30 | 20 | 8 |
| 105 | 5 m | 40° | +10 | +0 | +0 | +40 | 50 | 2 |

FIG.5

| CAMERA ID | PERSON ID | FEATURE AMOUNT | THUMBNAIL | UPDATE TIME |
|---|---|---|---|---|
| 101 | 1 | ..... | ■ | 12 : 10 : 00 |
| 101 | 2 | ..... | ■ | 12 : 25 : 00 |
| 101 | 3 | ..... | ■ | 13 : 30 : 00 |
| 101 | 4 | ..... | ■ | 15 : 45 : 00 |
| 102 | 1 | ..... | ■ | 11 : 05 : 00 |
| 103 | 1 | ..... | ■ | 15 : 10 : 00 |
| 103 | 2 | ..... | ■ | 15 : 20 : 00 |
| 103 | 3 | ..... | ■ | 18 : 15 : 00 |
| 104 | 1 | ..... | ■ | 16 : 05 : 00 |
| 104 | 2 | ..... | ■ | 17 : 20 : 00 |
| 104 | 3 | ..... | ■ | 18 : 10 : 00 |
| 105 | 1 | ..... | ■ | 10 : 05 : 00 |
| 105 | 2 | ..... | ■ | 10 : 25 : 00 |

FIG.6

| CAMERA ID | PERSON ID | THUMBNAIL | CAMERA ID | PERSON ID | THUMBNAIL | COLLATION SCORE | TRAINING INFORMATION |
|---|---|---|---|---|---|---|---|
| 101 | 1 | ▓ | 102 | 1 | ▓ | 510 | NEGATIVE |
| 101 | 1 | ▓ | 103 | 1 | ▓ | 120 | NEGATIVE |
| 101 | 1 | ▓ | 103 | 2 | ▓ | 130 | NEGATIVE |
| 101 | 1 | ▓ | 103 | 3 | ▓ | 250 | NEGATIVE |
| 101 | 1 | ▓ | 104 | 1 | ▓ | 320 | NEGATIVE |
| 101 | 1 | ▓ | 104 | 2 | ▓ | 820 | POSITIVE |
| 101 | 1 | ▓ | 104 | 3 | ▓ | 410 | NEGATIVE |
| 101 | 1 | ▓ | 105 | 1 | ▓ | 440 | NEGATIVE |
| 101 | 1 | ▓ | 105 | 2 | ▓ | 320 | NEGATIVE |
| 101 | 2 | ▓ | 102 | 1 | ▓ | 560 | NEGATIVE |
| 101 | 2 | ▓ | 103 | 1 | ▓ | 820 | POSITIVE |
| 101 | 2 | ▓ | 103 | 2 | ▓ | 340 | NEGATIVE |
| 101 | 2 | ▓ | 103 | 3 | ▓ | 550 | NEGATIVE |

INFORMATION PROCESSING APPARATUS, INFORMATION PROCESSING METHOD, AND STORAGE MEDIUM

BACKGROUND OF THE INVENTION

Field of the Invention

The present disclosure relates to an information processing apparatus, an information processing method, and a storage medium storing an information processing program.

Description of the Related Art

With recent improvements in video analysis technology, a system has been devised in which a feature amount of each object is acquired from a video image captured by each of a plurality of cameras installed in a city and the acquired feature amount is collated with a feature amount of the object acquired from a video image captured by another camera, to thereby perform person identification between the cameras.

Japanese Patent No. 4759988 discusses a system in which a moving object is extracted from a video image captured by each camera using an image recognition technique and the extracted moving object is collated between the cameras. In this system, a movement path of the moving object is obtained and it is determined whether the moving object has entered a limited area, thereby making it possible to display an alarm to an observer.

In many cases, however, accuracy of person identification between cameras varies depending on the installation position and angle of view of each camera and is affected by the illumination within an image capturing range. For example, in a case of using an image of a person captured by a certain camera and collating the person using another camera, appearance of the person greatly varies depending on the orientation of the person or how illumination is applied. This may lead to a failure in collation processing.

SUMMARY OF THE INVENTION

According to an aspect of the present disclosure, an information processing apparatus includes a comparison unit configured to compare an image capturing condition for a collation target object with an image capturing condition for each of a plurality of image capturing apparatuses, a selection unit configured to select an image capturing apparatus to be collated from among the plurality of image capturing apparatuses based on a result of the comparison by the comparison unit, and a collation unit configured to collate information about an object captured by the image capturing apparatus to be collated with information about the collation target object.

Further features of the present disclosure will become apparent from the following description of exemplary embodiments with reference to the attached drawings.

DESCRIPTION OF THE EMBODIMENTS

Exemplary embodiments according to the present disclosure will be described with reference to the accompanying drawings.

A first exemplary embodiment illustrates a case where field view structure information and person feature amounts, which are obtained from a plurality of image capturing apparatuses or video images, are analyzed, and a camera group with a high probability of collation success (hereinafter referred to as collation probability) is selected for the collation.

Figure 1:
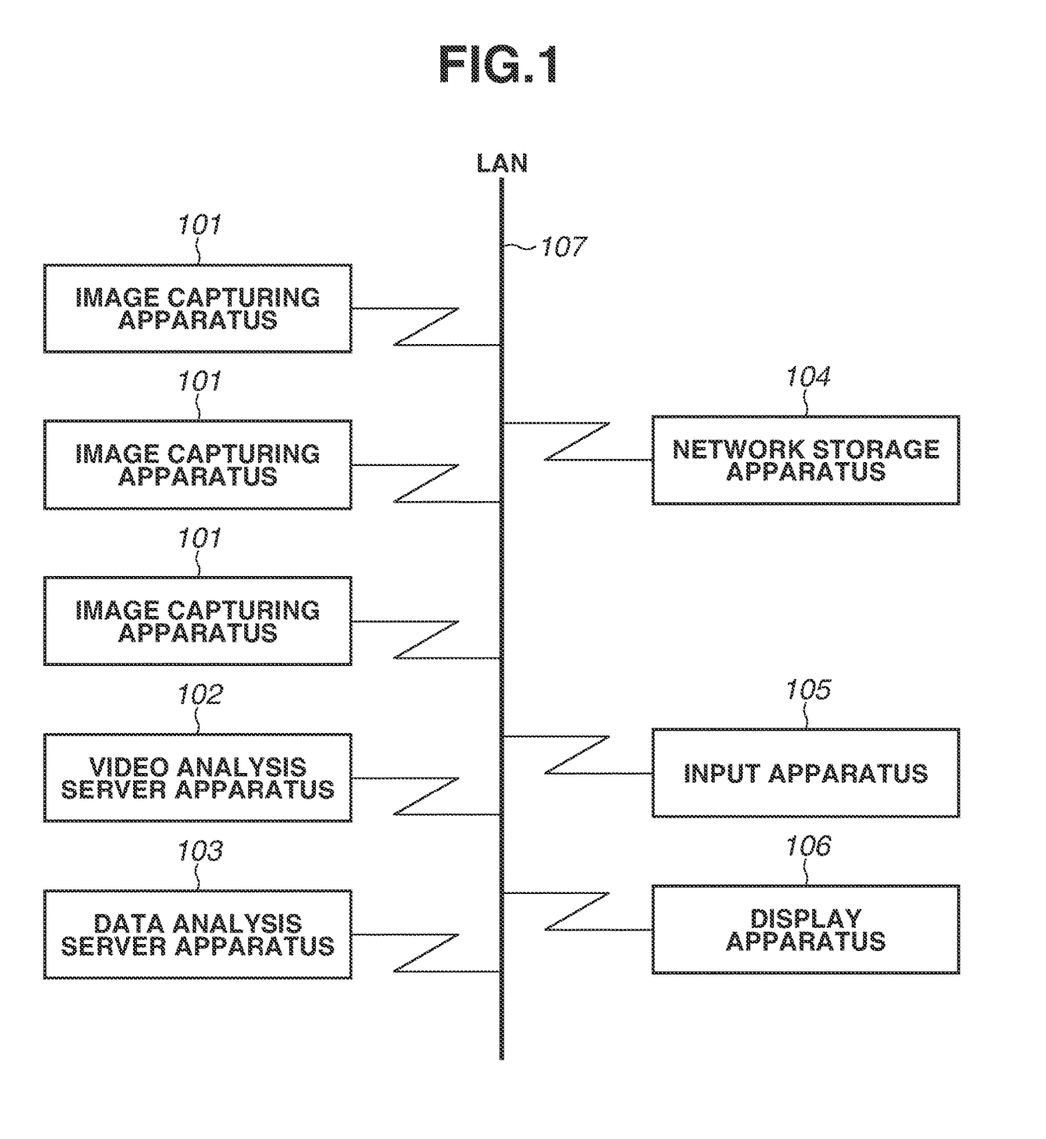
FIG. 1 is a block diagram illustrating an example of a system configuration of a video processing system.

FIG. 1 is a block diagram illustrating an example of a system configuration of a video processing system. Image capturing apparatuses 101, which are network cameras, a video analysis server apparatus 102, a data analysis server apparatus 103, a network storage apparatus 104, an input apparatus 105, and a display apparatus 106 are connected via a local area network (LAN) 107 which is a network line.

Each image capturing apparatus 101 is an image capturing apparatus such as a network camera. The video analysis server apparatus 102 collects video data captured by a plurality of installed cameras (image capturing apparatuses 101 in this system) and performs video analysis processing. In the video analysis processing, a feature amount is extracted from, for example, a face area of a person in an image. The data analysis server apparatus 103 collects the feature amount extracted by the video analysis server apparatus 102 and camera parameters concerning the image capturing apparatuses 101, and performs data analysis processing. In the data analysis processing, for example, the feature amount of the person extracted by the video analysis server apparatus 102 is collated to perform person identification. The network storage apparatus 104 is a recording apparatus. On the network storage apparatus 104, following data are recorded via the LAN 107: images captured by the image capturing apparatuses 101, the feature amount extracted by the video analysis server apparatus 102, and the collation result obtained by the collation of a person performed by the data analysis server apparatus 103. The input apparatus 105 is used to input a user operation related to analysis processing. Examples of the input apparatus 105 include a mouse, a keyboard, and a touch panel. The display apparatus 106 displays analysis data through a user interface. The display apparatus 106 displays, for example, analysis data in such a manner that an analysis result is superimposed on video data recorded on the network storage apparatus 104 and on layout information about cameras.

A number of the plurality of image capturing apparatuses 101 is not limited as long as at least two image capturing apparatuses 101 are provided. Although FIG. 1 illustrates a single video analysis server apparatus 102, a single data analysis server apparatus 103, a single network storage apparatus 104, a single input apparatus 105, and a single display apparatus 106, numbers of these apparatuses are not limited as long as these apparatuses can be identified by, for example, network addresses.

The input apparatus 105 and the display apparatus 106 are, for example, personal computers (PCs). However, a physical connection to the LAN 107 is not limited only to a wired connection. Instead, a wireless connection, like in a tablet terminal, may be used. As long as the connection is established based on a protocol, any physical connection may be used.

Figure 2:
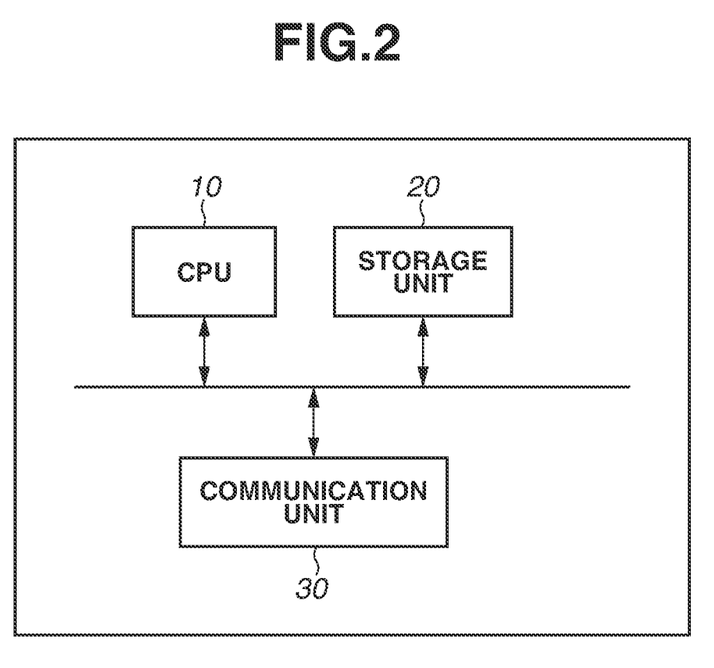
FIG. 2 is a block diagram illustrating an example of a hardware configuration of an information processing apparatus.

FIG. 2 is a block diagram illustrating an example of a hardware configuration of information processing apparatuses, such as the video analysis server apparatus 102, the data analysis server apparatus 103, and the network storage apparatus 104. As illustrated in FIG. 2, each of the information processing apparatuses includes, as a hardware configuration, a central processing unit (CPU) 10, a storage unit 20, and a communication unit 30. The CPU 10 controls the entire operation of the information processing apparatus. The storage unit 20 stores, for example, programs and data. The data is used when the CPU 10 executes processing based on the programs. The communication unit 30 connects each information processing apparatus to a network such as the LAN 107 and controls communication with other apparatuses. The CPU 10 of the video analysis server apparatus 102 executes processing based on programs stored in the storage unit 20 of the video analysis server apparatus 102, thereby implementing functions of the video analysis server apparatus 102 illustrated in FIG. 3 described below. The CPU 10 of the video analysis server apparatus 102 executes programs stored in the storage unit 20 of the video analysis server apparatus 102, thereby implementing processing in flowcharts illustrated in FIGS. 8 and 9 described below. The CPU 10 of the data analysis server apparatus 103 executes processing based on programs stored in the storage unit 20 of the data analysis server apparatus 103, thereby implementing functions of the data analysis server apparatus 103 illustrated in FIG. 3 described below. The CPU 10 of the data analysis server apparatus 103 executes processing based on programs stored in the storage unit 20 of the data analysis server apparatus 103, thereby implementing processing in a flowchart illustrated in FIG. 10 described below.

Figure 3:
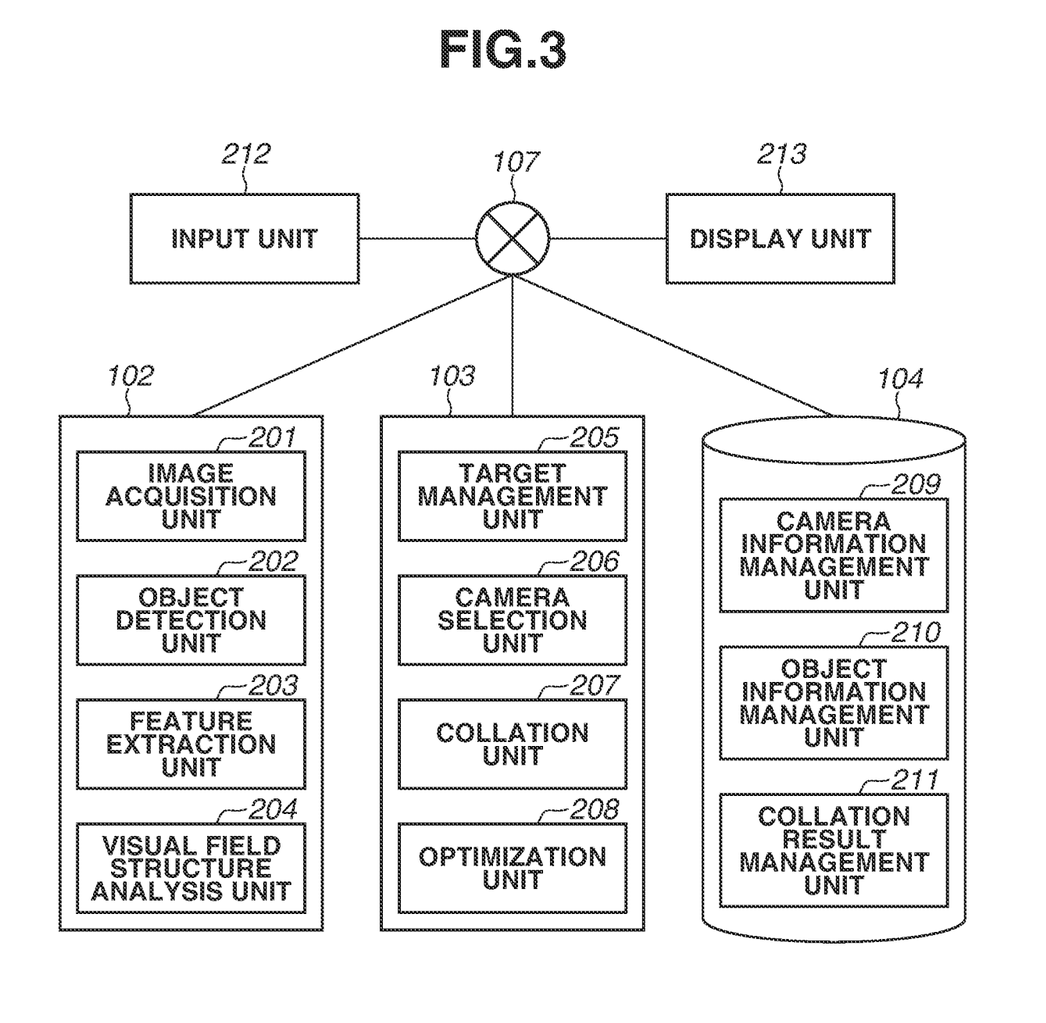
FIG. 3 is a block diagram illustrating an example of a functional configuration of the video processing system.

FIG. 3 is a block diagram illustrating an example of a functional configuration of the video processing system. The video processing system includes, as functional components, an image acquisition unit 201, an object detection unit 202, a feature extraction unit 203, a visual field structure analysis unit 204, a target management unit 205, a camera selection unit 206, a collation unit 207, an optimization unit 208, a camera information management unit 209, an object information management unit 210, a collation result management unit 211, an input unit 212, and a display unit 213.

Among the components described above, the image acquisition unit 201, the object detection unit 202, the feature extraction unit 203, and the visual field structure analysis unit 204 are implemented on the video analysis server apparatus 102. The target management unit 205, the camera selection unit 206, the collation unit 207, and the optimization unit 208 are implemented on the data analysis server apparatus 103. The camera information management unit 209, the object information management unit 210, and the collation result management unit 211 are implemented on the network storage apparatus 104. The camera selection unit 206, the collation unit 207, and the optimization unit 208 may be implemented on the video analysis server apparatus 102. The distribution of functions is not limited to the example illustrated in FIG. 3.

The image acquisition unit 201 sequentially acquires images from the image capturing apparatuses 101 via the LAN 107 at predetermined time intervals, and provides the acquired images to the object detection unit 202. The acquisition of images performed by the image acquisition unit 201 is not limited to the input of captured images acquired from the image capturing apparatuses 101. For example, images may be input by loading video data (recorded video image) from the network storage apparatus 104, and by a streaming input via a network.

The object detection unit 202 detects a target object from an image acquired from the image acquisition unit 201. Hereinafter, the target object is a person. The object detection unit 202 collects the following information as detected information, and provides the collected information to the feature extraction unit 203: a camera identification (ID) acquired from the image acquisition unit 201, an ID for a detected target (hereinafter referred to as a person ID), and an image obtained by clipping a person area. In the processing of detecting a target from an image, a method of detecting the entire body of a person as discussed in, for example, the following document can be used: "N. Dalal, B. Triggs, Histograms of Oriented Gradients for Human Detection, Institute of Electrical and Electronics Engineers (IEEE) Computer Society Conference on Computer Vision and Pattern Recognition (CVPR), 2005."

The feature extraction unit 203 executes feature amount extraction processing for extracting a feature amount of a detection target using detected information obtained from the object detection unit 202. The feature extraction unit 203 collects the following information as object information, and provides the collected information to the management unit 210: a camera ID and a person ID, which are included in the detected information, the extracted feature amount, and an image obtained by clipping a person area. In the feature extraction processing, a method of calculating features of the entire body of a person as discussed in, for example, the following document can be used: "S. Paisitkriangkrai, Learning to rank in person re-identification with metric ensembles. IEEE Computer Society Conference on Computer Vision and Pattern Recognition (CVPR), 2015."

The visual field structure analysis unit 204 executes visual field structure analysis processing for analyzing an installation height and a depression angle (which are hereinafter referred to as a visual field structure) of each image capturing apparatus 101 based on images acquired by the image acquisition unit 201. The visual field structure analysis unit 204 collects the following information as visual field structure information, and provides the collected information to the camera information management unit 209: the camera ID of the image acquisition unit 201, and the analyzed visual field structure. In the visual field structure analysis processing, a method of estimating a three-dimensional scene structure based on edges in an image as discussed in, for example, the following document can be used: "D. Changsoo Lee, M. Hebert, T. Kanade, Geometric Reasoning for Single Image Structure Recovery, IEEE Computer Society Conference on Computer Vision and Pattern Recognition (CVPR), 2009."

The target management unit 205 acquires object information based on which collation is performed from query information input from the input unit 212, and manages the object information. The query information is information for designating a person to be collated and information including a camera ID and a person ID. The target management unit 205 provides each of the camera selection unit 206 and the collation unit 207 with target information including a camera ID, a person ID, a feature amount, and a thumbnail. The target management unit 205 acquires the object information based on which collation is performed by searching object information corresponding to query information from the object information management unit 210. For example, in a case where camera ID=101 and person ID=2 are searched as query information in an object information management table illustrated in FIG. 5, the target management unit 205 can extract object information in the second row of the object information management table.

The target management unit 205 identifies a person whose collation score exceeds an update threshold from the collation result obtained from the collation result management unit 211, and updates target information using the object information obtained from the object information management unit 210. The update threshold is a value indicating that detected persons are identified as a same person if the collation score exceeds the value. For example, in a case where the threshold is set to 500, as seen from a collation result management table illustrated in FIG. 6, the collation score of the person whose camera ID=102 and person ID=1 and the collation score of the person whose camera ID=104 and person ID=2 exceed the threshold when target information indicates that camera ID=101 and person ID=1. If there is a plurality of collation results indicating that the collation score exceeds the threshold, the target management unit 205 updates the target information using the collation result having the highest collation score among the plurality of collation results. The target information is updated by overwriting the camera ID, the person ID, and the feature amount. When the target information is sequentially updated, the information based on which collation is performed varies stepwise. The collation processing can be more comprehensively performed than in the case of not updating the target information, accordingly.

The camera selection unit 206 selects a camera to be collated based on target information obtained from the target management unit 205 and camera information obtained from the camera information management unit 209. Alternatively, the camera selection unit 206 selects a camera to be collated based on target information obtained from the target management unit 205 and the collation result obtained from the collation result management unit 211. The camera selection unit 206 provides the collation unit 207 with the camera ID corresponding to the selected camera.

An example of processing for selecting a camera to be collated using camera information will be described. Camera information $C_i$ is represented as $C_i = [H, \theta, B_R, G_G, G_B, T, Z, Bv]$ for a camera $ID_i$, where H represents a camera height, $\theta$ represents a depression angle, $G_R$, $G_G$ and $G_B$ respectively represent R-gain, G-gain, and B-gain values (adjustment values for color temperature of the camera) as camera parameters, T represents a tilt value, Z represents a zoom value, and Bv represents a Bv value, which are visual field structure information as illustrated in a camera information management table of FIG. 4. The camera selection unit 206 identifies camera information about target information using the camera ID concerning the target information. The camera selection unit 206 then compares camera information $C_t$ about the target information with other camera information $C_i$, and obtains a camera information similarity $S(C_t, C_i)$. The camera information similarity represents a degree of similarity between the compared camera visual field structure information and camera parameters. The camera selection unit 206 calculates a difference between vectors using a formula $\text{Sub}(C_t, C_i) = |C_t - C_i|$, and obtains a camera information similarity based on the function $S(C_t, C_i) = \text{MAX} - \text{Sub}(C_t, C_i)$, which indicates that a similarity increases as a value of the difference ($\text{Sub}(C_t, C_i)$) decreases. MAX, which is a similarity maximum value, is defined by a maximum value that can be taken by $\text{Sub}(C_t, C_i)$. Alternatively, the camera selection unit 206 may obtain the difference by weighting each element of the camera information $C_i$. The camera selection unit 206 sets a camera group having a camera information similarity more than or equal to a predetermined threshold as information about the selected camera. Using the similarity in the camera information and selecting a camera for executing collation processing make it possible to compare feature amounts of persons whose images are captured under similar image capturing conditions (e.g., an angle of view and brightness) and to reduce a failure in collation processing due to the orientation of the person and fluctuations in illumination.

Next, an example of a method of selecting cameras using person collation results between cameras executed by the collation result management unit 211 will be described. The camera selection unit 206 identifies a camera that captures an image of a current target based on the camera ID included in the target information, and sets the camera as a start point camera. The camera selection unit 206 then acquires, for a pair of the start point camera and a camera other than the start point camera, a supervised collation result from the collation result management unit 211 or the input unit 212. The term "supervised collation result" refers to information including a collation score of a pair of persons and information indicating whether the person pair indicates the same person (the information is hereinafter referred to as training information) as illustrated in the collation result management table in FIG. 6. Positive training information indicates that the person pair indicates the same person, and negative training information indicates that the person pair indicates different persons.

Figure 6:
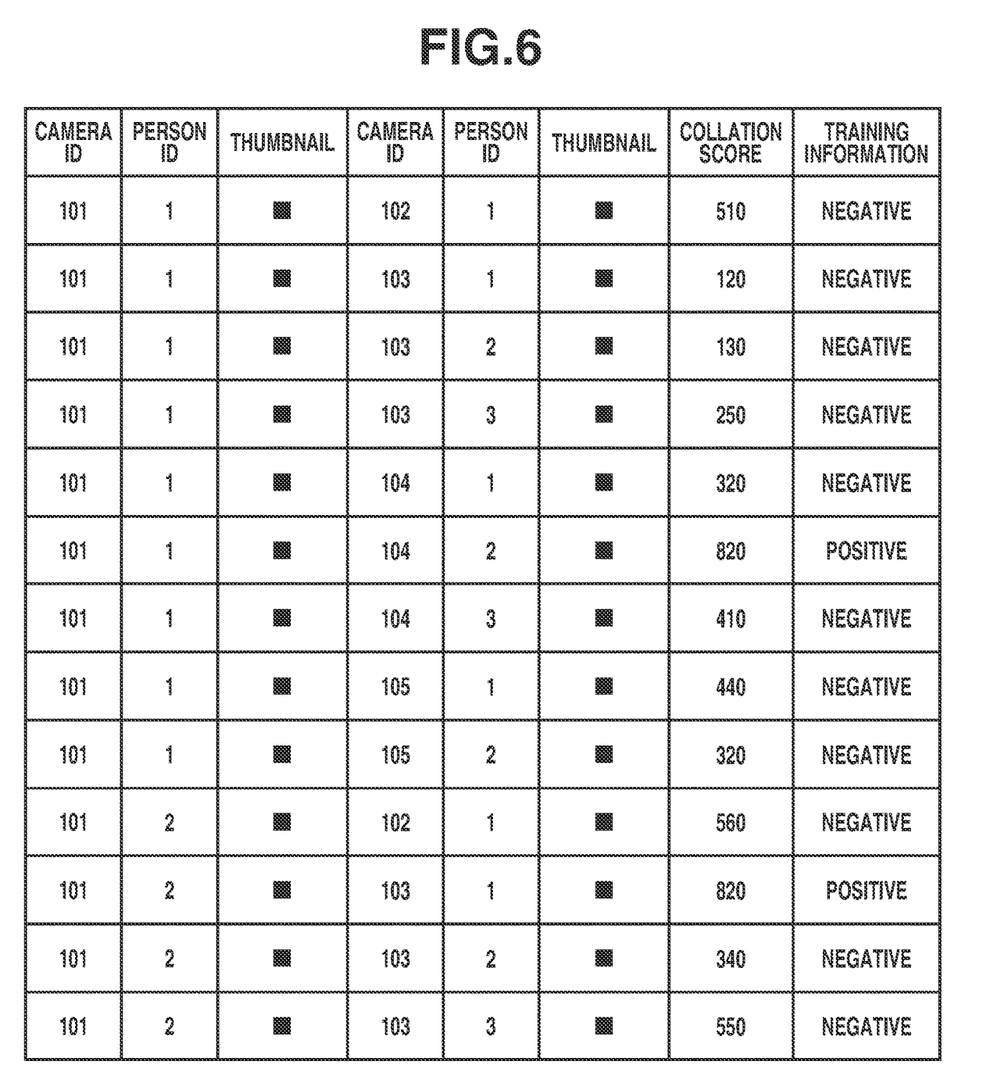
FIG. 6 illustrates an example of a collation result management table.

FIG. 6 illustrates that, for example, a pair of (camera ID=101, person ID=1) and (camera ID=102, person ID=1) indicates collation score=510 and negative training information. With respect to this result, the camera selection unit 206 determines whether a person pair is correctly collated using a predetermined collation threshold. For example, when the collation threshold is set to 500, the collation score of the person pair described above is 510, and thus the collation result shows that the person pair indicates the same person. On the other hand, since the training information indicates that the person pair indicates different persons, it is determined that the collation for the person pair has failed. The camera selection unit 206 then obtains a collation probability of each camera pair based on information indicating whether each person pair has been correctly collated. In the calculation of the collation probability, a method of obtaining a harmonic average of a precision and a recall as discussed in, for example, "D. Powers, Evaluation: from precision, recall and f-measure to roc, informedness, markedness and correlation, Journal of Machine Learning Technologies, vol. 2, no. 1, pp. 37-63, 2011." can be used. The camera selection unit 206 sets a camera group having a collation probability more than or equal to the predetermined threshold as the selected camera.

The collation unit 207 compares feature amounts using the target information obtained from the target management unit 205, the object information obtained from the object information management unit 210, and the camera ID selected by the camera selection unit 206, and thereby performing person identification between cameras. The collation unit 207 provides the collation result management unit 211 with the pair of the target information and the object information and the collation score as the collation result. In the comparison of feature amounts, a method of comparing features of the entire body of a person as discussed in, for example, the above-described "Learning to rank in person re-identification with metric ensembles." can be used.

The optimization unit 208 corrects the collation result using the inter-camera person collation results accumulated in the collation result management unit 211. The correction by optimization processing makes it possible to reduce an inconsistency that different persons are identified as the same person and to reduce adverse effects, such as deterioration in accuracy due to the order of collation processing. The optimization unit 208 provides the collation result management unit 211 with the corrected collation result. In the optimization of the inter-camera person collation result, a method of defining a relationship and similarity between persons as a graph and obtaining a movement path of each person as a cost minimization problem as discussed in, for example, "D. Changsoo Lee, M. Hebert, T. Kanade, Geometric Reasoning for Single Image Structure Recovery, IEEE Computer Society Conference on Computer Vision and Pattern Recognition (CVPR), 2009." can be used. However, the correction processing of the optimization unit 208 need not necessarily be performed.

Figure 4:
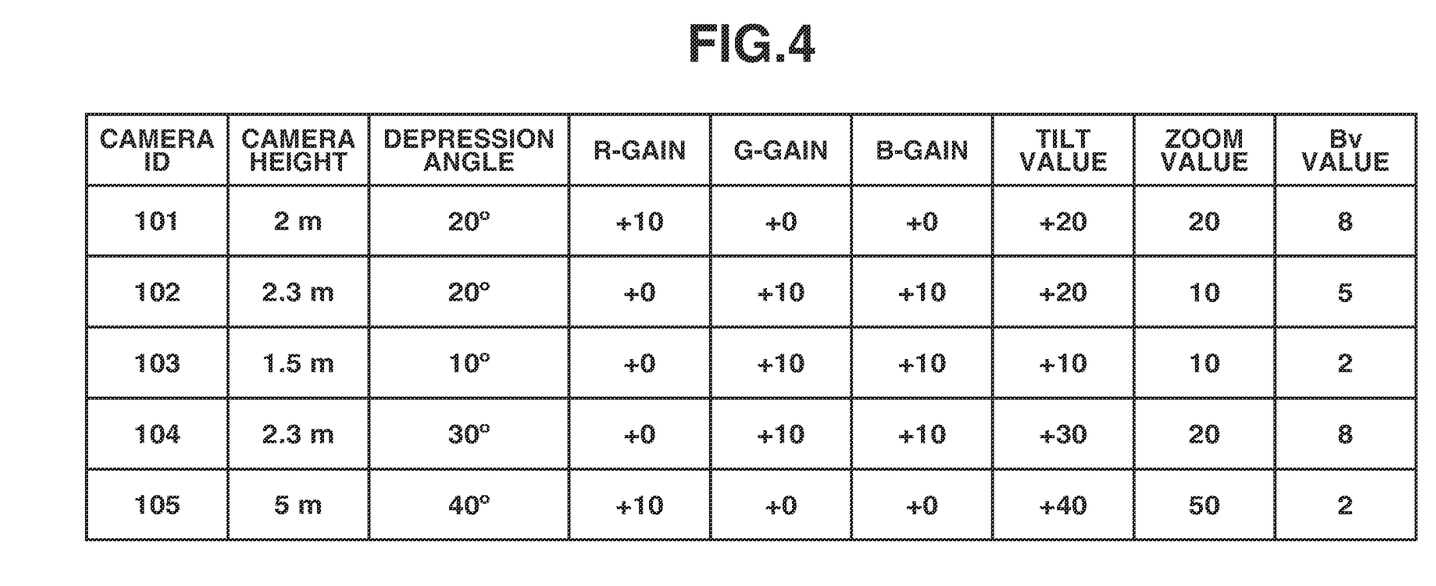
FIG. 4 illustrates an example of a camera information management table.

The camera information management unit 209 stores, in the camera information management table, camera parameters for the image capturing apparatuses 101 and the visual field structure information obtained from the visual field structure analysis unit 204. FIG. 4 is a table illustrating an example of the camera information management table. In the case of acquiring the stored camera information again, the camera information management unit 209 acquires the corresponding camera information using a camera ID as a key value.

Figure 5:
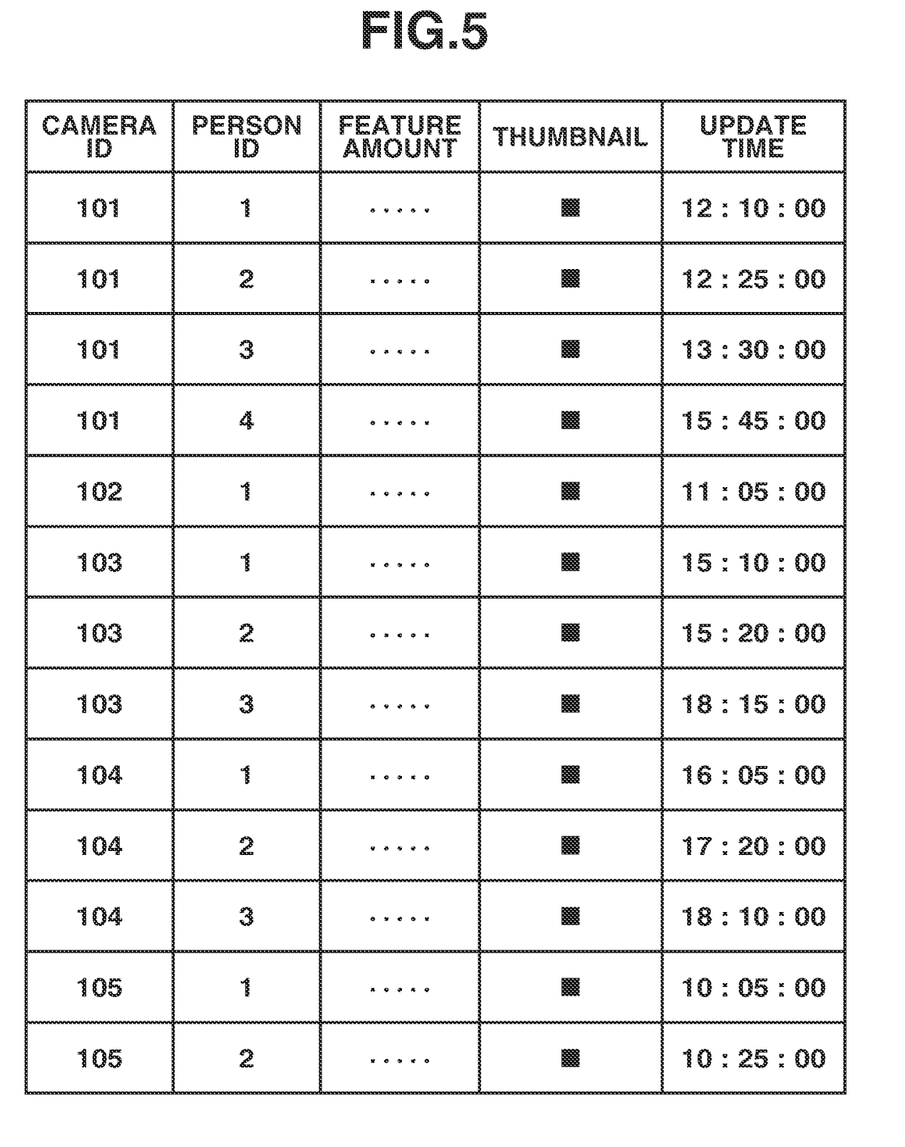
FIG. 5 illustrates an example of an object information management table.

The object information management unit 210 stores the object information obtained by the feature extraction unit 203 in the object information management table. FIG. 5 is a table illustrating an example of the object information management table. In the case of acquiring the stored object information again, the object information management unit 210 acquires one or both of the corresponding feature amount and an image obtained by clipping a person area in an image of each person (the image is hereinafter referred to as a thumbnail) using a camera ID and a person ID as two key values. The object information management unit 210 may store and acquire the time when the object information is updated in the object information management table.

The collation result management unit 211 stores the collation result obtained from the collation unit 207 in the collation result management table. FIG. 6 is a table illustrating an example of the collation result management table. In the case of acquiring the stored collation result again, the collation result management unit 211 acquires the corresponding collation score, thumbnail, and training information by using two pairs of a camera ID and a person ID as key values. For example, the collation score of the person whose camera ID=101 and person ID=1 and the collation score of the person whose camera ID=102 and person ID=1 are 510. The collation score of the person whose camera ID=101 and person ID=1 and the collation score of the person whose camera ID=104 and person ID=2 are 820. Thus, it is obvious that the person whose camera ID=104 and person ID=2 is most likely to match the person whose camera ID=101 and person ID=1. The collation result management unit 211 stores the training information input from the input unit 212 in the collation result management table.

The input unit 212 provides the collation result management unit 211 with the training information input by a user through the input apparatus 105. The display unit 213 displays the collation result obtained from the collation result management unit 211, to thereby provide the user with the collation result. The user checks the displayed collation result and determines whether the person pair indicates the same person by visual observation. When the person pair indicates the same person, positive training information is input. When the person pair indicates different persons, negative training information is input. The training information is used in camera selection processing for the camera selection unit 206. The input unit 212 may input the collation processing result and training information processed by another system, and may provide the collation result management unit 211 with the input collation processing result and training information.

Figure 7:
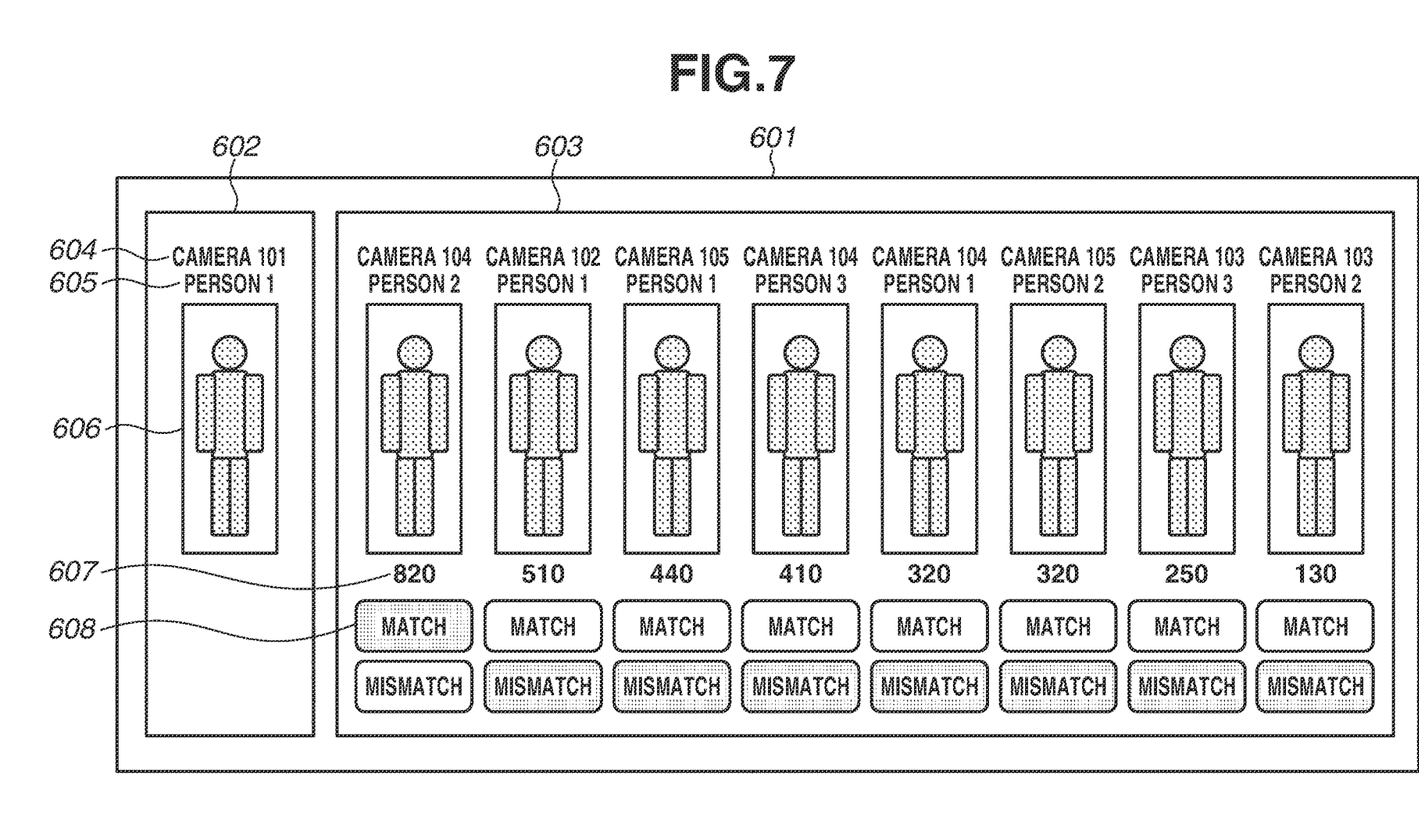
FIG. 7 illustrates an example where a collation result is displayed.

FIG. 7 is a diagram illustrating an example where the collation result illustrated in FIG. 6 is displayed. Target information 602 and a collation result 603 corresponding to the target information 602 are displayed on a display screen 601. In this example, persons obtained as a result of collation processing are sequentially displayed in descending order of collation score. In each of the target information 602 and the collation result 603, a camera ID 604, a person ID 605, and a thumbnail 606 are displayed. In addition, a collation score 607 and a training information input button 608 are displayed in the collation result. The training information input button 608 is used for the user to input training information. For example, when a button that indicates "match" and is located below camera ID=104 and person ID=2 is selected, the input unit 212 issues positive training information for the person whose camera ID=101 and person ID=1 and the collation result indicating camera ID=104 and person ID=2. When the button is selected again, the input unit 212 executes processing for cancelling the issued training information. In the example illustrated in FIG. 7, the selected state of each button is indicated by a shaded area, and the non-selected state of each button is indicated by a non-shaded area.

In the detection performed by the object detection unit 202, according to the above-described "Histograms of Oriented Gradients for Human Detection", histograms of oriented gradients are extracted from an image, and a person is identified using a model obtained by learning extracted feature amounts by a support vector machine. However, other identification methods may be used. For example, feature amounts to be extracted are not limited to histograms of oriented gradients, and instead, Haar-like features, Local Binary Pattern Histogram (LBPH) features, and other features, or a combination thereof may be used. The extracted feature amounts are shared to detect a person. The model for identifying a person is not limited to a support vector machine, and instead, an adaptive boosting (AdaBoost) discriminator, a randomized tree, and other methods may be used. The person detection result is output as position coordinates of four vertices representing a rectangle that surrounds a person in each image. The position coordinates as well as the likelihood representing the detection result is output. The likelihood indicates a result of collation between an extracted feature amount and a model for identifying a person, and also indicates a degree of match with the model. To identify a target position more accurately, a method of tracking a human body as discussed in "B. Benfold, Stable multi-target tracking in real-time surveillance video, IEEE Computer Society Conference on Computer Vision and Pattern Recognition (CVPR), 2011." may also be used. According to this method, the position of a person that cannot be detected with a single image is identified by tracking the person detected by detection processing in subsequent frames, thereby making it possible to identify the target position with high accuracy. The tracking method is not limited to the method described above, and any tracking method can be used as long as the target position can be identified. As tracking processing, for example, mean-shift tracking, Kalman filter, and on-line boosting may be used.

The feature extraction processing performed by the feature extraction unit 203 is processing of extracting features of a target. The feature extraction processing is not limited to the processing of extracting a specific feature amount. Any feature extraction processing may be performed as long as information indicating a target can be extracted. For example, as a type of a feature amount, a scale-invariant feature transform (SIFT) feature, a color histogram, and the like, or a combination thereof may be used.

The visual field structure analysis unit 204 performs processing for estimating an installation position and a depression angle of each camera based on images acquired from each camera and depth information acquired from an attached depth sensor. However, the estimation processing is not limited to a specific estimation method. For example, an environment in a range in which a camera captures an image is three-dimensionally reconstructed based on depth information and a floor surface is estimated from the reconstructed three-dimensional environment, to thereby perform back-calculation of the installation position of the camera.

The collation processing performed by the collation unit 207 is processing of comparing features obtained by the feature extraction unit 203. The collation processing is not limited to a specific comparison method. As the comparison method, for example, Li distance, Bhattacharyya distance, and cross-eyed viewing may be used.

The optimization processing performed by the optimization unit 208 is processing of correcting the collation result based on the accumulated collation results. The optimization processing is not limited to a specific optimization method. As the optimization method, for example, a method of obtaining a total optimum collation solution by dynamic programming with global restraint conditions may be used. Further, a method of setting a camera pair to be collated by Minimum Spanning Tree (MST) and weighting the MST to obtain a solution may also be used.

Figure 8:
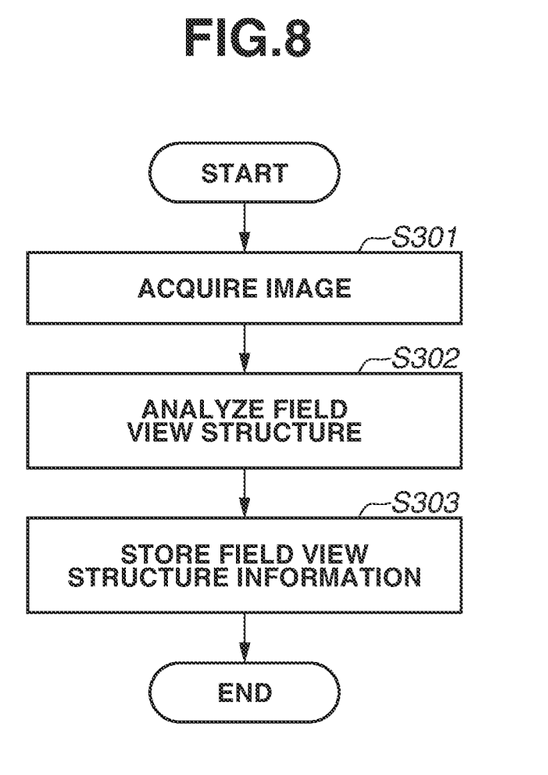
FIG. 8 is a flowchart illustrating an example of processing for analyzing visual field structure information.
Figure 9:
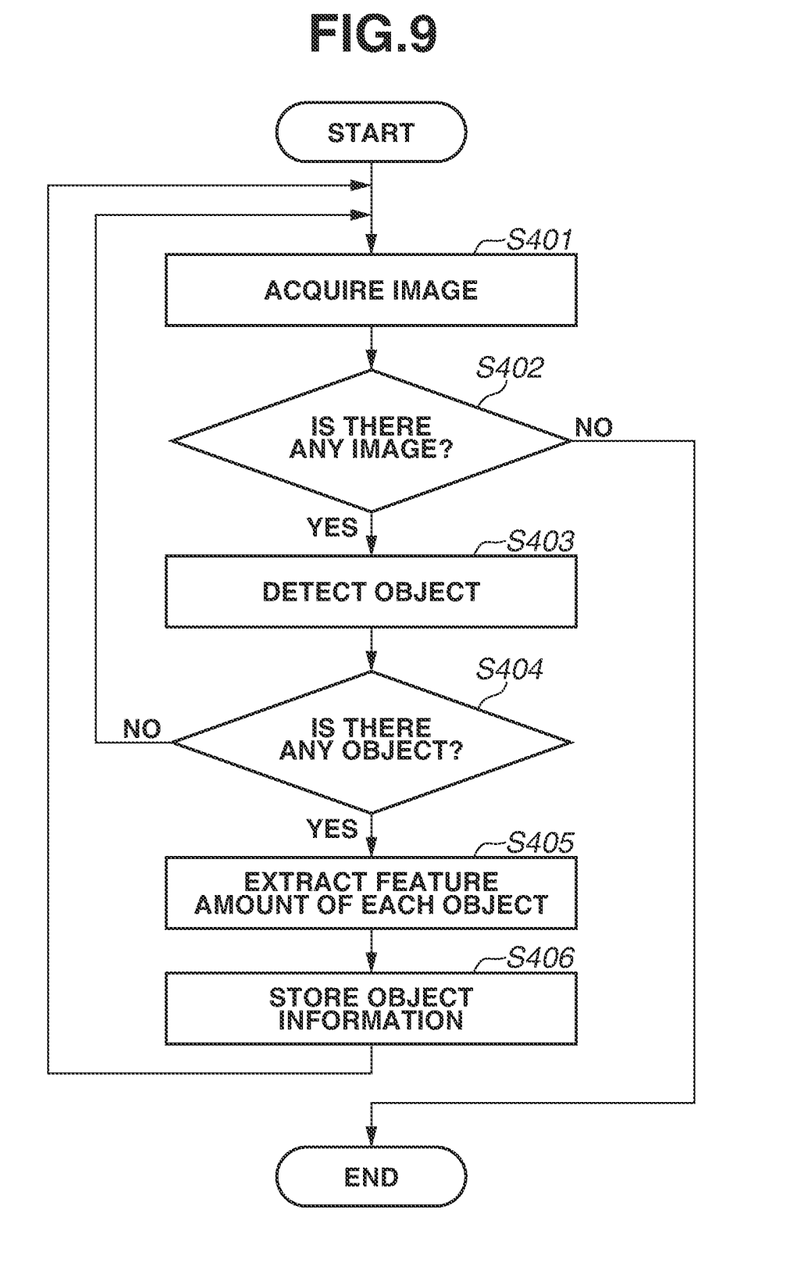
FIG. 9 is a flowchart illustrating an example of processing for extracting a feature amount of a detected object.
Figure 10:
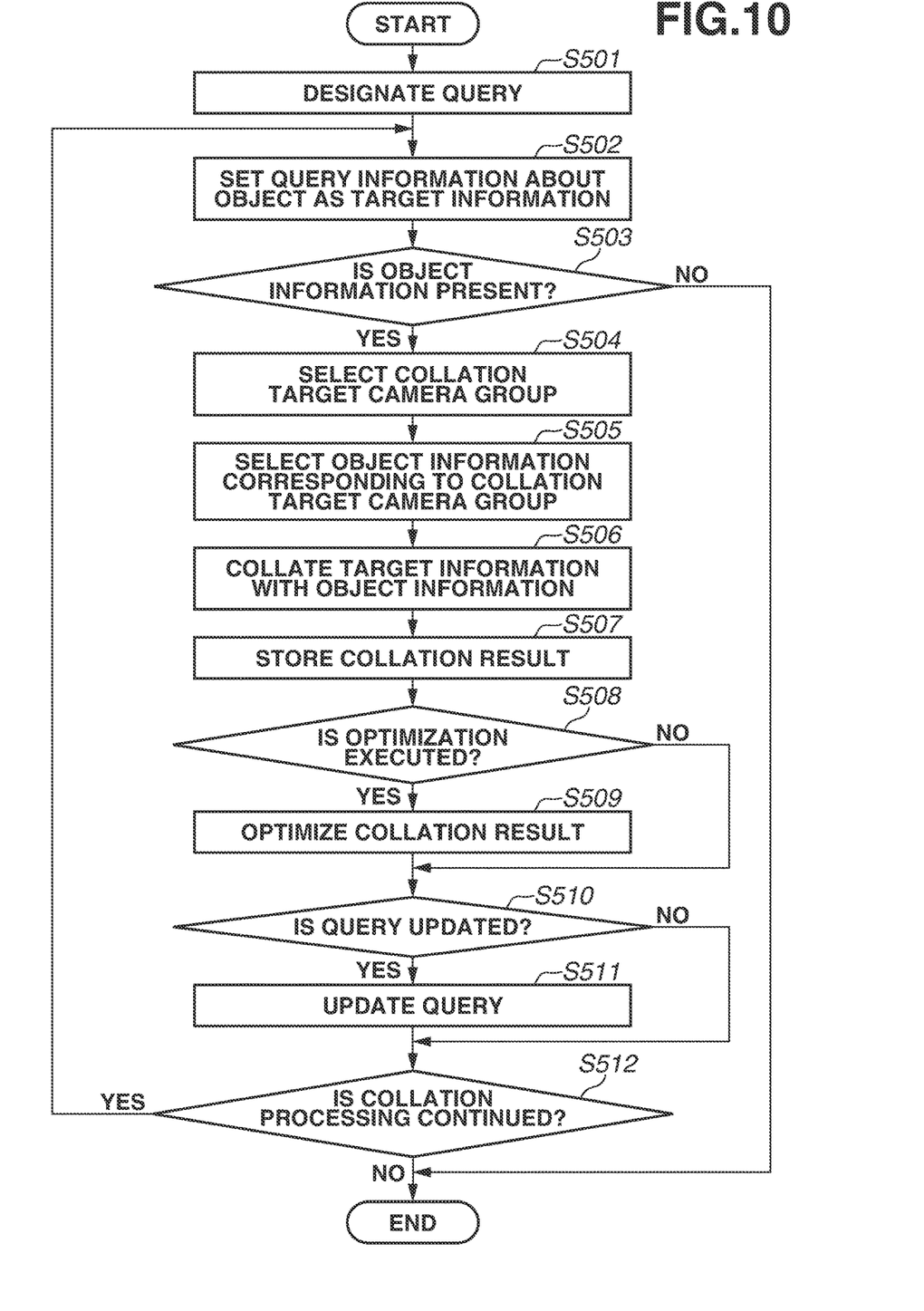
FIG. 10 is a flowchart illustrating an example of processing for collating a target object.

FIGS. 8, 9, and 10 are flowcharts each illustrating a processing flow according to the first exemplary embodiment.

A processing flow of analyzing visual field structure information will be described with reference to FIG. 8. In step S301, the image acquisition unit 201 acquires an image. In step S302, the visual field structure analysis unit 204 analyzes a visual field structure of the acquired image. In step S303, the camera information management unit 209 stores visual field structure information obtained by the analysis.

Next, a processing flow of extracting a feature amount of each detected object will be described with reference to FIG. 9. In step S401, the image acquisition unit 201 acquires an image. In step S402, the image acquisition unit 201 determines whether an image has been acquired. If the image acquisition unit 201 determines that an image has been acquired (YES in step S402), the processing proceeds to step S403. If the image acquisition unit 201 determines that no image has been acquired (NO in step S402), the processing of extracting the feature amount of each object ends. In step S403, the object detection unit 202 extracts an object present in the image. If there is a plurality of objects, the object detection unit 202 extracts each of the objects. In step S404, the object detection unit 202 determines whether there is any object. If the object detection unit 202 determines that there is an object (YES in step S404), the processing proceeds to step S405. If the object detection unit 202 determines that there is no object (NO in step S404), the processing returns to step S401. In step S405, the feature extraction unit 203 extracts a feature amount of each object. In step S406, the feature extraction unit 203 stores object information including the extracted feature amount in the object information management unit 210. After the processing of step S406 is finished, the processing returns to step S401.

Next, a processing flow of collating a target object will be described with reference to FIG. 10. In step S501, the input unit 212 acquires query information instructed by the user. The query information includes a thumbnail image indicating an object and a camera ID of a camera that captures an image of the object. The input unit 212 may be configured to automatically detect an object with an abnormal behavior, issue query information, search for an object from previous video images, and use a search result indicating that the image capturing time is closest to the current time as query information.

In step S502, the target management unit 205 sets the input query information as target information. In step S503, the target management unit 205 determines whether object information corresponding to the query information is present. If the target management unit 205 determines that object information corresponding to the query information is present (YES in step S503), the processing proceeds to step S504. If the target management unit 205 determines that object information corresponding to the query information is not present (NO in step S503), the processing of collating the target object ends.

In step S504, the camera selection unit 206 selects a collation target camera (group). In step S505, the collation unit 207 acquires a plurality of pieces of object information corresponding to the collation target camera group from the object information management unit 210. In step S506, the collation unit 207 collates the target information with the object information. In step S507, the collation unit 207 stores the collation result in the collation result management unit 211.

In step S508, the optimization unit 208 determines whether optimization is executed. If the optimization unit 208 determines that optimization is executed (YES in step S508), the processing proceeds to step S509. If the optimization unit 208 determines that optimization is not executed (NO in step S508), the processing proceeds to step S510. In step S509, the optimization unit 208 executes optimization. In step S508, for example, when an elapsed time from the last time when the target is updated is more than or equal to a predetermined value, the optimization unit 208 determines that optimization is executed. The optimization unit 208 may provide an optimization schedule and may periodically execute optimization processing.

In step S510, the target management unit 205 determines whether the query is updated based on the collation result. If the target management unit 205 determines that the query is updated (YES in step S510), the processing proceeds to step S511. If the target management unit 205 determines that the query is not updated (NO in step S510), the processing proceeds to step S512. If the collation score is more than or equal to a predetermined value, the target management unit 205 determines that the query is updated. When the elapsed time from the last time when the target is updated is equal to a predetermined value, the target management unit 205 may determine that the query is updated. In step S511, the target management unit 205 updates the query information.

In step S512, the collation unit 207 determines whether the collation processing is continued. If the collation unit 207 determines that the collation processing is continued (YES in step S512), the processing returns to step S502. If the collation unit 207 determines that the collation processing is not continued (NO in step S512), the processing of collating the target object ends. Thus, the query information can be updated based on the optimized collation result, and the collation processing can be repeatedly performed based on the updated query information. Consequently, it may be possible to accurately collate even an object that cannot be accurately collated based only on the original query information due to a difference in image capturing conditions or the like, by reflecting collation results about other objects in the query information.

As described above, the video processing system obtains the collation probability based on statistical information about the collation accuracy of a plurality of camera pairs based on results of collation of a plurality of persons and training information, camera information, the similarity between visual field structures, or other information, and selects a camera to be collated based on the collation probability. Further, query information is updated based on the optimized collation result, and collation processing is repeatedly performed based on the updated query information. Therefore, for example, in the case of collating a target person with persons whose images are captured by a plurality of cameras, the collation processing is preferentially performed on persons whose images are captured by a camera with a small variation in appearance from that of a camera that has captured an image of the target person, thereby making it possible to reduce a failure in collation processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-127603, filed Jul. 9, 2019, which is hereby incorporated by reference herein in its entirety.

What is claimed is:

1. An information processing apparatus comprising:
   a memory storing instructions; and
      a processor which, when executing the instructions, causes the information processing apparatus to:
      compare an image capturing condition for each of a plurality of image capturing apparatuses;
   select a pair of the image capturing apparatuses to be collated from among the plurality of image capturing apparatuses based on a similarity between the image capturing condition for each of pairs of the plurality of image capturing apparatuses; and
   collate information about an object captured by each of the pair of the image capturing apparatus to determine whether objects captured by each of the pair of the image capturing apparatus are the same.

2. The information processing apparatus according to claim 1, wherein the image capturing condition includes information about a field view of each of the plurality of image capturing apparatuses.

3. The information processing apparatus according to claim 2, wherein the processor causes the information processing apparatus to analyze an image captured by each of the plurality of image capturing apparatuses to acquire the information about the field view.

4. The information processing apparatus according to claim 2, wherein the information about the field view includes information about one of a height and a depression angle of each of the plurality of image capturing apparatuses.

5. The information processing apparatus according to claim 1, wherein the image capturing condition includes an image capturing parameter for each of the plurality of image capturing apparatuses.

6. The information processing apparatus according to claim 5, wherein the image capturing parameter includes one of a tilt value and a zoom value for image capturing by each of the plurality of image capturing apparatuses.

7. The information processing apparatus according to claim 1, wherein the image capturing condition includes an illumination condition for image capturing by each of the plurality of image capturing apparatuses.

8. The information processing apparatus according to claim 1, wherein the similarity is calculated based on a difference between vectors having a plurality of elements of the image capturing condition.

9. The information processing apparatus according to claim 1, wherein the processor causes the information processing apparatus to update the information about the collation target object.

10. The information processing apparatus according to claim 9, wherein the update unit updates the information about the collation target object based on a result of the collation by the collation unit.

11. The information processing apparatus according to claim 1, wherein the information about the collation target object is obtained if a similarity between the information about the object captured by each of the pair of the image capturing apparatus is larger than or equal to a threshold value, and the information about the same object is not obtained if a similarity between the information about the object captured by each of the pair of the image capturing apparatus is smaller than the threshold value.

12. An information processing apparatus comprising:
a memory storing instructions; and
   a processor which, when executing the instructions, causes the information processing apparatus to:
   acquire a result of collation between an object captured by an image capturing apparatus that has captured an image of a collation target object and an object captured by each of a plurality of image capturing apparatuses, the plurality of image capturing apparatuses being different from the image capturing apparatus that has captured the collation target object;
select an image capturing apparatus to be collated from among the plurality of image capturing apparatuses based on a result of the collation, wherein the selected image capturing apparatus and the image capturing apparatus that has captured the image of a collation target object are determined as a pair of the image capturing apparatuses; and
information about an object captured by each of the pair of the image capturing apparatus to determine whether an object captured by the selected image capturing apparatus and the collation target object are same.

13. The information processing apparatus according to claim 12, wherein a collation probability for each of the plurality of image capturing apparatuses is obtained based on the result of the collation to select the image capturing apparatus to be collated based on the collation probability.

14. The information processing apparatus according to claim 12, wherein the result of the collation includes training information indicating whether the collation is correct or not.

15. The information processing apparatus according to claim 14, wherein the processor causes the information processing apparatus to:
display the result of the collation; and
input the training information for the displayed result of the collation.

16. An information processing method comprising:
comparing an image capturing condition for each of a plurality of image capturing apparatuses;
selecting a pair of the image capturing apparatuses to be collated from among the plurality of image capturing apparatuses based on a similarity between the image capturing condition for each of pairs of the plurality of image capturing apparatuses; and
collating information about an object captured by each of the pair of the image capturing apparatus to determine whether objects captured by each of the pair of the image capturing apparatus are the same.

17. An information processing method comprising:
acquiring a result of collation between an object captured by an image capturing apparatus that has captured an image of a collation target object and an object captured by each of a plurality of image capturing apparatuses, the plurality of image capturing apparatuses being different from the image capturing apparatus that has captured the collation target object;
selecting an image capturing apparatus to be collated from among the plurality of image capturing apparatuses based on a result of the collation, wherein the selected image capturing apparatus and the image capturing apparatus that has captured the image of a collation target object are determined as a pair of the image capturing apparatuses; and
collating information about an object captured by each of the pair of the image capturing apparatus to determine whether an object captured by the selected image capturing apparatus and the collation target object are the same.

18. A non-transitory computer-readable storage medium storing a program that causes a computer to execute a method comprising:
comparing an image capturing condition for each of a plurality of image capturing apparatuses;
selecting a pair of the image capturing apparatuses to be collated from among the plurality of image capturing apparatuses bases on a similarity between the image capturing condition for each of pairs of the plurality of image capturing apparatuses; and
collating information about an object captured by each of the pair of the image capturing apparatus to determine whether objects captured by each of the pair of the image capturing apparatus are the same.

19. A non-transitory computer-readable storage medium storing a program that causes a computer to execute a method comprising:
acquiring a result of collation between an object captured by an image capturing apparatus that has captured an image of a collation target object and an object captured by each of a plurality of image capturing apparatuses, the plurality of image capturing apparatuses being different from the image capturing apparatus that has captured the collation target object;
a selecting an image capturing apparatus to be collated from among the plurality of image capturing apparatuses based on a result of the collation, wherein the selected image capturing apparatus and the image capturing apparatus that has captured the image of a collation target object are determined as a pair of the image capturing apparatuses; and
collating information about an object captured by each of the pair of the image capturing apparatus to determine whether an object captured by the selected image capturing apparatus and the collation target object are same.

* * * * *